United States Patent
Bye et al.

(10) Patent No.: US 7,117,086 B2
(45) Date of Patent: Oct. 3, 2006

(54) GPS/IMU CLOCK SYNCHRONIZATION PARTICULARLY FOR DEEP INTEGRATION VECTOR TRACKING LOOP

(75) Inventors: Charles T. Bye, Eden Prairie, MN (US); Brian W. Schipper, Brooklyn Park, MN (US); Lawrence C. Vallot, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 212 days.

(21) Appl. No.: 10/657,413

(22) Filed: Sep. 8, 2003

(65) Prior Publication Data
US 2005/0065723 A1    Mar. 24, 2005

(51) Int. Cl.
*G01C 21/26* (2006.01)
(52) U.S. Cl. ............. 701/213; 701/200; 701/220; 342/357.12; 342/357.14
(58) Field of Classification Search ............. 701/207, 701/213, 214, 216, 217, 220, 221, 200; 702/176–178; 342/357.01, 357.02, 357.06, 357.12, 357.14, 342/358
See application file for complete search history.

(56) References Cited
U.S. PATENT DOCUMENTS

| | | | |
|---|---|---|---|
| 5,717,402 A * | 2/1998 | Chu | 342/357.12 |
| 5,717,403 A * | 2/1998 | Nelson et al. | 342/357.12 |
| 5,894,323 A * | 4/1999 | Kain et al. | 348/116 |
| 6,234,799 B1 * | 5/2001 | Lin | 434/30 |
| 6,292,748 B1 * | 9/2001 | Harrison | 701/213 |
| 6,317,688 B1 * | 11/2001 | Bruckner et al. | 701/213 |
| 6,452,377 B1 * | 9/2002 | Clark | 324/76.58 |
| 6,516,021 B1 * | 2/2003 | Abbott et al. | 375/150 |
| 6,573,799 B1 * | 6/2003 | Akopian | 331/64 |
| 6,633,621 B1 * | 10/2003 | Bishop et al. | 375/376 |
| 6,651,031 B1 * | 11/2003 | Akopian | 702/178 |
| 6,721,657 B1 * | 4/2004 | Ford et al. | 701/213 |
| 2001/0020216 A1 | 9/2001 | Lin | 701/216 |
| 2004/0093435 A1 * | 5/2004 | Purho | 709/400 |
| 2005/0015198 A1 * | 1/2005 | Kee et al. | 701/207 |
| 2005/0060093 A1 * | 3/2005 | Ford et al. | 701/214 |

* cited by examiner

*Primary Examiner*—Gertrude A. Jeanglaude
(74) *Attorney, Agent, or Firm*—Dina Khaled, Esq.; Armstrong Teasdale LLP

(57) ABSTRACT

A navigation system includes an inertial measurement unit, a navigation computer, a GPS receiver, and a clock controller. The inertial measurement unit has a first clock and a first switch, the navigation computer has a second clock and a second switch, and the GPS receiver has a third clock. The clock controller controls the first and second switches. Accordingly, the inertial measurement unit, the navigation computer, and the GPS receiver may use their own clocks, or the inertial measurement unit and the navigation computer may use the second clock, or the inertial measurement unit, the navigation computer, and the GPS receiver may use the third clock.

33 Claims, 1 Drawing Sheet

US 7,117,086 B2

GPS/IMU CLOCK SYNCHRONIZATION PARTICULARLY FOR DEEP INTEGRATION VECTOR TRACKING LOOP

TECHNICAL FIELD OF THE INVENTION

The present invention relates to the synchronization of clocks used in a navigation system that includes an inertial measurement unit, a global positioning system, and/or a navigation computer.

BACKGROUND OF THE INVENTION

A navigation system frequently relies on an inertial measurement unit (IMU) and a global positioning system (GPS) that interface with a navigation computer to provide navigation control and/or guidance of a craft such as an airplane, missile or submarine. In operation, the navigation system may assume control of the GPS tracking loops by use of a Kalman filter, which is commonly referred to as Deep Integration. Because of the precise nature of how the tracking loops are driven, the navigation system as described above requires precise alignment of the clock signals incorporated within the global positioning system, the inertial measurement unit, and the navigation computer. Furthermore, because of varying computational performance in the navigation computer, a phase adjustment mechanism is desirable in order to precisely adjust the time alignment of the data from the inertial measurement unit, the data from the global positioning system, and the tracking loop commands.

The present invention is directed to an arrangement that provides clock synchronization for a navigation system. Additionally or alternatively, the present invention may also be arranged to adjust the time alignment of the data from the inertial measurement unit, the data from the global positioning system, and the tracking loop commands of the navigation system.

SUMMARY OF THE INVENTION

According to one aspect of the present invention, a navigation system comprises an inertial measurement unit, a navigation computer, and a clock controller. The inertial measurement unit has a clock and the navigation computer has a clock. The clock controller enables only the navigation computer to be clocked by the clock of the navigation computer at times, and the clock controller enables both the navigation computer and the inertial measurement unit to be clocked by the clock of the navigation computer at other times.

According to another aspect of the present invention, a navigation system comprises an inertial measurement unit, a navigation computer, and a clock controller. The inertial measurement unit has a first clock and a first switch, and the navigation computer has a second clock and a second switch. The clock controller controls the first and second switches so as to selectively supply a clock signal from the second clock to only the navigation computer and to both the navigation computer and the inertial measurement unit.

According to still another aspect of the present invention, a method comprises the following: supplying a first clock signal from a clock of a navigation computer only to components of the navigation computer in response to a first condition; supplying the first clock signal from the clock of the navigation computer to components of the navigation computer and to components of an inertial measurement unit in response to a second condition; and, supplying a second clock signal from a clock of a GPS receiver to components of the GPS receiver, to components of the navigation computer, and to components of the inertial measurement unit in response to a third condition.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
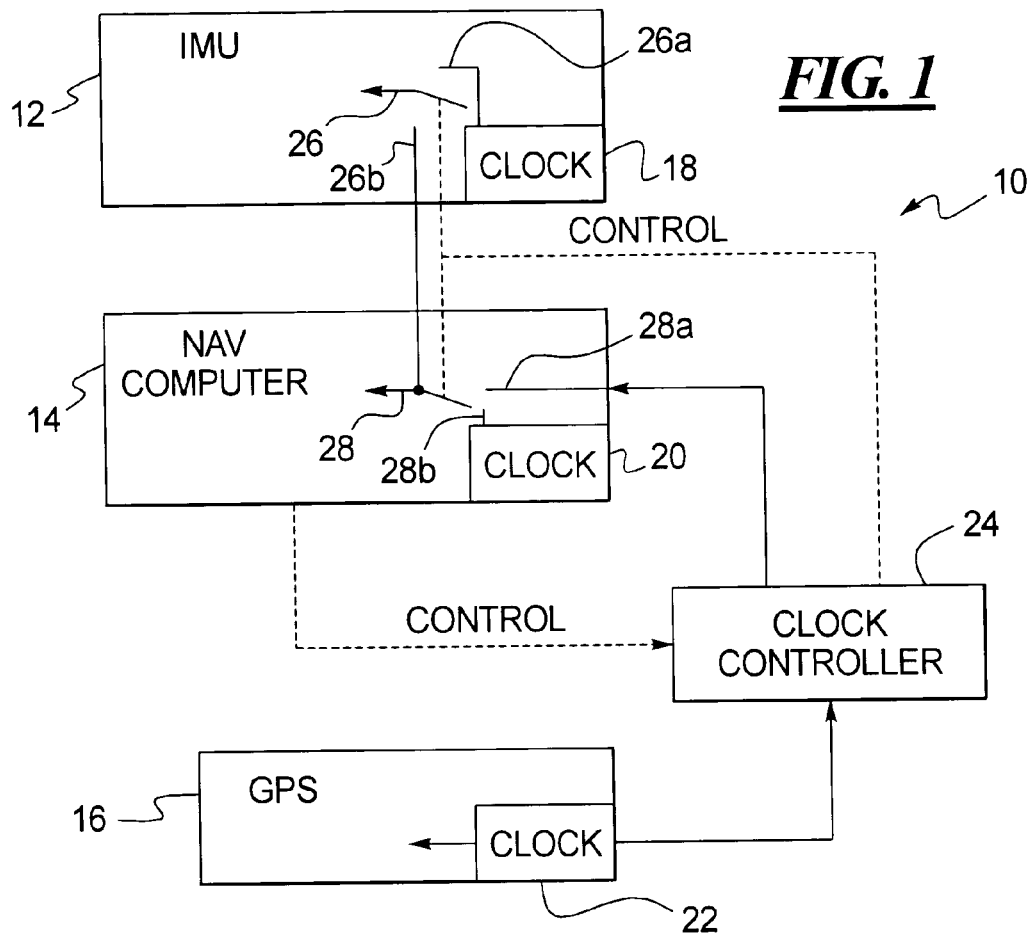
FIG. 1 is a schematic diagram of a navigation system including a clock selection feature according to an embodiment of the present invention; and, FIG. 2 illustrates a phase adjustment enhancement of the clock selection feature shown in FIG. 1.

A navigation system 10 is shown in FIG. 1 and is used to provide navigation control and/or guidance of a craft such as an airplane, missile or submarine. In terms of an aircraft, the navigation system 10 may be used to automatically control the flight of the aircraft, and/or the navigation system 10 may be used to provide read outs to the pilot so as to guide the pilot in the flight of the aircraft.

The navigation system 10 may include one or more of an inertial measurement unit 12, a navigation computer 14, and/or a global positioning system (GPS) receiver 16. In the embodiment shown in FIG. 1, the navigation system 10 includes the inertial measurement unit 12, the navigation computer 14, and the GPS receiver 16. The inertial measurement unit 12 normally includes a clock 18, the navigation computer 14 normally includes a clock 20, and the GPS receiver 16 normally includes a clock 22.

In addition to the clock 18, the inertial measurement unit 12 includes components such as inertial sensors and electronics. The inertial sensors, for example, may be accelerometers and/or gyros. The electronics of the inertial measurement unit 12 control the inertial sensors and suitably process the signals from the inertial sensors. In addition to the clock 20, the navigation computer 14 includes components such as hardware and software to perform various functions and computations in support of the guidance and/or control of a craft. In addition to the clock 22, the GPS receiver 16 includes components useful in determining a global position of a craft.

When the navigation system 10 includes only the inertial measurement unit 12, or when only the inertial measurement unit 12 is functioning properly, the clock 18 is used to provide clock signals for clocking the components of the inertial measurement unit 12. When the navigation system 10 includes only the navigation computer 14, or when only the navigation computer 14 is functioning properly, the clock 20 is used to provide clock signals for clocking the components of the navigation computer 14. When the navigation system 10 includes only the GPS receiver 16, or when only the GPS receiver 16 is functioning properly, the clock 22 is used to provide clock signals for clocking the components of the GPS receiver 16.

However, when combinations of more than one of the inertial measurement unit 12, the navigation computer 14, and the GPS receiver 16 are present and are functioning properly, the vector tracking loop of the navigation system 10 requires precise alignment of the clocks 18, 20, and/or 22 of the inertial measurement unit 12, the navigation computer 14, and/or the GPS receiver 16. Therefore, the clock functions of the selected combination of the inertial measurement unit 12, the navigation computer 14, and the GPS receiver 16 must be synchronized.

Accordingly, the navigation system 10 includes a clock controller 24. The clock controller 24 may comprise, for example, a field programmable gate array. The clock controller 24 is controlled, such as by the navigation computer 14, to select one of the clocks 18, 20, and 22 to provide the clock signals for all of the components selected for inclusion or operation in the navigation system 10 (i.e., the inertial measurement unit 12, the navigation computer 14, and/or the GPS receiver 16).

To perform this clock selection function, the clock controller 24 is coupled to a switch 26 in the inertial measurement unit 12 and to a switch 28 in the navigation computer 14. The switch 26 has terminals 26a and 26b, and the switch 28 has terminals 28a and 28b. The switches 26 and 28 may be mechanical switches, electronic switches, magnetic switches, etc. When the GPS receiver 16 is included in the navigation system 10, the clock controller 24 is also coupled so as to receive the clock signal from the clock 22 of the GPS receiver 16.

With this arrangement, the clock controller 24 selects one of the clocks 18, 20, and 22 to provide the clock signals to the components depending upon the combination of the inertial measurement unit 12, the navigation computer 14, and/or the GPS receiver 16 selected to be included or active in the navigation system 10. For example, if the inertial measurement unit 12, the navigation computer 14, and the GPS receiver 16 are all active in the navigation system 10, the clock controller 24 operates the switch 26 against its terminal 26b and operates the switch 28 against its terminal 28a. Accordingly, the clock controller 24 supplies the clock signal from the clock 22 of the GPS receiver 16 to the inertial measurement unit 12 through the switches 26 and 28 and to the navigation computer 14 through the switch 28. In this configuration, the clock 22 of the GPS receiver 16 supplies clock signals to clock the inertial measurement unit 12, the navigation computer 14, and the GPS receiver 16. Therefore, clock functions of the inertial measurement unit 12, the navigation computer 14, and the GPS receiver 16 are synchronized.

Alternatively, if only the inertial measurement unit 12 and the navigation computer 14 are active in the navigation system 10, the clock controller 24 operates the switch 26 against its terminal 26b and operates the switch 28 against its terminal 28b. Accordingly, the clock controller 24 controls the switches 26 and 28 so that the clock signal from the clock 20 of the navigation computer 14 is supplied to the inertial measurement unit 12. In this configuration, the clock 20 of the navigation computer 14 supplies clock signals to clock the inertial measurement unit 12 and the navigation computer 14. Therefore, clock functions of the inertial measurement unit 12 and the navigation computer 14 are synchronized. In this configuration, the clock controller 24 does not pass through the clock signal from the clock 22.

Therefore, clock synchronization is accomplished by enabling the navigation computer 14 to utilize a switchable clock input, and by enabling the inertial measurement unit 12 to utilize a clock source from the navigation computer 14. Normally, the navigation computer 14 uses its own oscillator (the clock 20) as its time source. However, to achieve better alignment with inertial data, the inertial measurement unit 12 can be clocked by the clock 20 of the navigation computer 14. Furthermore, to adequately take control and drive the tracking loops of the GPS receiver 16 by use of Deep Integration, the clocking functions of the inertial measurement unit 12, the navigation computer 14, and the GPS receiver 16 preferably should be coupled to a single clock source. This coupling is achieved by sharing the clock 22 of the GPS receiver 16 with the navigation computer 14 and also with the inertial measurement unit 12.

The navigation computer 14 uses its own oscillator, the clock 20, for operation when the inertial measurement unit 12 is not present or has failed. The navigation computer 14 can share its oscillator, the clock 20, with the inertial measurement unit 12 when the inertial measurement unit 12 is present but the deep integration of the GPS receiver 16 is not present or is not being executed. When deep integration provided by the GPS receiver 16 is present and is being executed, the navigation computer 14 can be configured to use the clock signal from the clock 22 of the GPS receiver 16, and the navigation computer 14 is also configured to send this clock signal to the inertial measurement unit 12 for Deep Integration operation.

Figure 2:
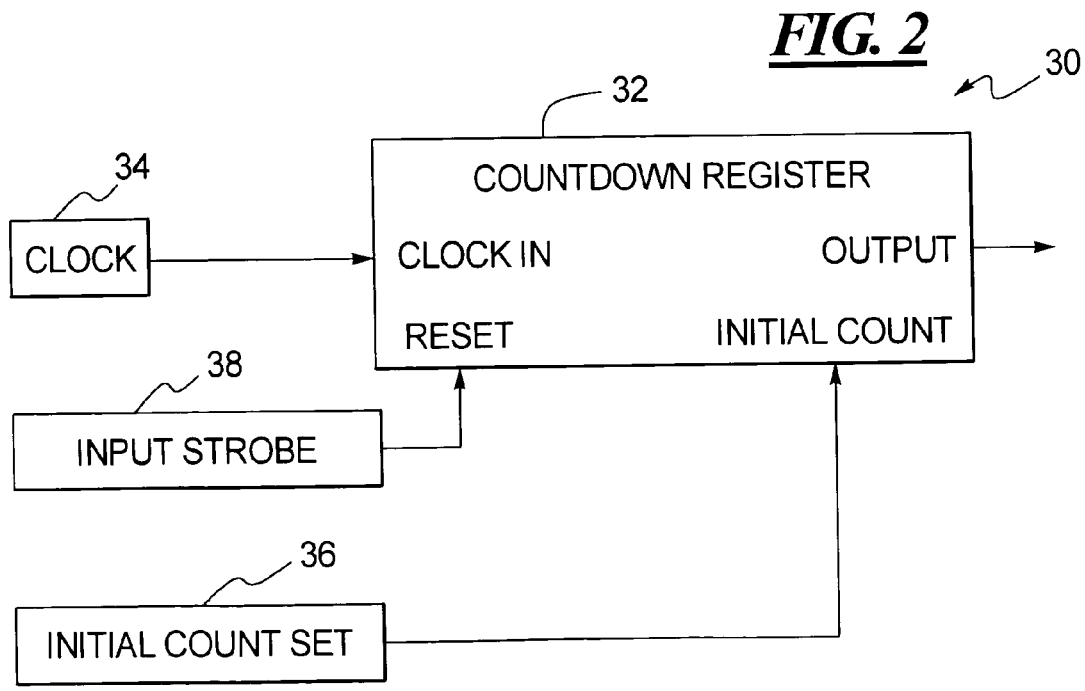

Moreover, because of varying computational performance in the navigation computer 14, a phase adjustment mechanism may be provided to precisely adjust the time alignment of the inertial data from the inertial measurement unit 12, the GPS data from the GPS receiver 16, and the tracking loop commands provided by the navigation computer 14. Accordingly, a phase controller 30 as shown in FIG. 2 is provided in the clock controller 24 so as to adjust the phase of the clock signal provided by the clock 22 of the GPS receiver 16 to the inertial measurement unit 12 and the navigation computer 14.

The phase controller 30 includes a count down register 32 that receives a clock input from a clock 34 that operates at a frequency that is $nf_{GPS}$, where $f_{GPS}$ is the frequency of the clock signal provided by the clock 22 of the GPS receiver 16, and where n is preferably an integer. A typical value for n is 1000, but n can be set to any value that provides the required precision in phase adjustment.

Also, an initial count is provided to an input 36 of the count down register 32. This initial count may be user defined. The initial count is typically set to the minimum phase delay until observation of the system performance is made to determine the optimum phase delay. For example, the optimum phase delay can be determined by experimental means in a lab environment by executing test software to observe the relationship between when commands are sent to the tracking loops of the GPS receiver 16 and when the results of those commands are seen. The optimum phase delay can also be set at run time in a similar fashion during the initialization phase of the software.

When the count down register 32 counts down from this initial value to a count of zero, the count down counter 32 provides an output pulse. Finally, an input 38 of the clock controller 30 receives the clock signal from the clock 22 of the GPS receiver 16.

Accordingly, each time that the count down register 32 receives a clock pulse at the input 38 from the clock 22 of the GPS receiver 16, the count down register 32 is reset to the initial count provided at the input 36. Thereafter, the count down register 32 is clocked by the clock signal from the clock 34 to count down to zero from the initial count. When the count down register 32 has counted down to zero, the count down register 32 provides an output clock pulse which is supplied as the clock output of the clock controller 24. In this manner, the clock pulse at the input 38 from the clock 22 of the GPS receiver 16 is delayed by a delay amount according to the initial count and the frequency $nf_{GPS}$ of the clock signal from the clock 34. This delay amount adjusts the phase of the clock signal from the clock 22 of the GPS receiver 16 in order to precisely adjust the time alignment of the inertial data from the inertial measurement unit 12, the GPS data from the GPS receiver 16, and the tracking loop commands provided by the navigation computer 14.

Certain modifications of the present invention have been discussed above. Other modifications will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A navigation system comprising:
    an inertial measurement unit having a clock;
    a navigation computer having a clock; and,
    a clock controller, wherein the clock controller enables only the navigation computer to be clocked by the clock of the navigation computer at times, and wherein the clock controller enables both the navigation computer and the inertial measurement unit to be clocked by the clock of the navigation computer at other times.

2. The navigation system of claim 1 wherein the clock controller comprises a phase controller that controls the phase of a clock signal.

3. The navigation system of claim 1 wherein the inertial measurement unit includes a first switch, wherein the navigation computer includes a second switch, and wherein the clock controller controls the first and second switches so as to enable only the navigation computer to be clocked by the clock of the navigation computer at times, and so as to enable both the navigation computer and the inertial measurement unit to be clocked by the clock of the navigation computer at other times.

4. The navigation system of claim 3 wherein the first switch comprises first and second terminals, wherein the first terminal is coupled to the clock of the inertial measurement unit and the second terminal is coupled to the second switch, wherein the second switch comprises a third terminal, wherein the third terminal is coupled to the clock of the navigation computer, and wherein the clock controller controls the first and second switches.

5. The navigation system of claim 1 further comprising a GPS receiver having a clock, wherein the clock of the GPS receiver is coupled to the clock controller, wherein the clock controller enables all of the inertial measurement unit, the navigation computer, and the GPS receiver to be clocked by the clock of the GPS receiver at still other times.

6. The navigation system of claim 5 wherein the inertial measurement unit includes a first switch, wherein the navigation computer includes a second switch, and wherein the clock controller controls the first and second switches so as to enable only the navigation computer to be clocked by the clock of the navigation computer at times, so as to enable both the inertial measurement unit and the navigation computer to be clocked by the clock of the navigation computer at other times, and to enable all of the inertial measurement unit, the navigation computer, and the GPS receiver to be clocked by the clock of the GPS receiver at still other times.

7. The navigation system of claim 6 wherein the first switch comprises first and second terminals and a first output, wherein the second switch comprises third and fourth terminals and a second output, wherein the first terminal is coupled to the clock of the inertial measurement unit, wherein the second terminal is coupled to the second output, wherein the third terminal is coupled to the clock of the navigation computer, wherein the fourth terminal is coupled to the clock controller, wherein the clock of the GPS receiver is coupled to the clock controller, and wherein the clock controller controls the first and second switches.

8. The navigation system of claim 5 wherein the clock controller comprises a phase controller that controls the phase of a clock signal from the clock of the GPS receiver.

9. The navigation system of claim 8 wherein the inertial measurement unit includes a first switch, wherein the navigation computer includes a second switch, and wherein the clock controller controls the first and second switches so as to enable only the navigation computer to be clocked by the clock of the navigation computer at times, so as to enable both the inertial measurement unit and the navigation computer to be clocked by the clock of the navigation computer at other times, and so as to enable all of the inertial measurement unit, the navigation computer, and the GPS receiver to be clocked by the clock of the GPS receiver at still other times.

10. The navigation system of claim 9 wherein the first switch comprises first and second terminals and a first output, wherein the second switch comprises third and fourth terminals and a second output, wherein the first terminal is coupled to the clock of the inertial measurement unit, wherein the second terminal is coupled to the second output, wherein the third terminal is coupled to the clock of the navigation computer, wherein the fourth terminal is coupled to the clock controller, wherein the clock of the GPS receiver is coupled to the clock controller, and wherein the clock controller controls the first, second, and third switches.

11. The navigation system of claim 8 wherein the phase controller comprises a count down register having a first input coupled to a clock source operating at a multiple of the clock of the GPS receiver, a second input coupled to the clock of the GPS receiver, and a third input receiving an initial count value.

12. A navigation system comprising:
    an inertial measurement unit having a first clock and a first switch;
    a navigation computer having a second clock and a second switch; and,
    a clock controller, wherein the clock controller controls the first and second switches so as to selectively supply a clock signal from the second clock to only the navigation computer and to both the navigation computer and the inertial measurement unit.

13. The navigation system of claim 12 wherein the clock controller comprises a phase controller that controls the phase of the clock signal.

14. The navigation system of claim 12 wherein the first switch comprises first and second terminals, wherein the first terminal is coupled to the clock of the inertial measurement unit and the second terminal is coupled to the second switch, wherein the second switch comprises a third terminal, wherein the third terminal is coupled to the clock of the navigation computer, and wherein the clock controller controls the first and second switches.

15. The navigation system of claim 12 further comprising a GPS receiver having a clock, wherein the clock of the GPS receiver is coupled to the clock controller, and wherein the clock controller controls the first and second switches so as to selectively supply a clock signal from the clock of the GPS receiver to all of the inertial measurement unit, the navigation computer, and the GPS receiver.

16. The navigation system of claim 15 wherein the first switch comprises first and second terminals and a first output, wherein the second switch comprises third and fourth terminals and a second output, wherein the first terminal is coupled to the clock of the inertial measurement unit, wherein the second terminal is coupled to the second output, wherein the third terminal is coupled to the clock of the navigation computer, wherein the fourth terminal is coupled to the clock controller, wherein the clock of the GPS receiver is coupled to the clock controller, and wherein the clock controller controls the first and second switches.

17. The navigation system of claim 15 wherein the clock controller comprises a phase controller that controls the phase of the clock signal from the clock of the GPS receiver.

18. The navigation system of claim 17 wherein the first switch comprises first and second terminals and a first output, wherein the second switch comprises third and fourth terminals and a second output, wherein the first terminal is coupled to the clock of the inertial measurement unit, wherein the second terminal is coupled to the second output, wherein the third terminal is coupled to the clock of the navigation computer, wherein the fourth terminal is coupled to the clock controller, wherein the clock of the GPS receiver is coupled to the clock controller, and wherein the clock controller controls the first, second, and third switches.

19. The navigation system of claim 17 wherein the phase controller comprises a count down register having a first input coupled to a clock source operating at a multiple of the clock of the GPS receiver, a second input coupled to the clock of the GPS receiver, and a third input receiving an initial count value.

20. A method comprising:
supplying a first clock signal from a clock of a navigation computer only to components of the navigation computer in response to a first condition;
supplying the first clock signal from the clock of the navigation computer to components of the navigation computer and to components of an inertial measurement unit in response to a second condition; and,
supplying a second clock signal from a clock of a GPS receiver to components of the GPS receiver, to components of the navigation computer, and to components of the inertial measurement unit in response to a third condition.

21. The method of claim 20 wherein the first condition comprises absence of the inertial measurement unit.

22. The method of claim 20 wherein the first condition comprises failure of the inertial measurement unit.

23. The method of claim 20 wherein the second condition comprises correct operation of the inertial measurement unit and absence of deep integration of the GPS receiver.

24. The method of claim 20 wherein the second condition comprises correct operation of the inertial measurement unit and non-execution of deep integration of the GPS receiver.

25. The method of claim 20 wherein the third condition comprises execution of deep integration of the GPS receiver.

26. The method of claim 20 further comprising adjusting time alignment of inertial data from the inertial measurement unit, GPS data from the GPS receiver, and tracking loop commands provided by the navigation computer.

27. The method of claim 26 wherein the first condition comprises absence of the inertial measurement unit.

28. The method of claim 26 wherein the first condition comprises failure of the inertial measurement unit.

29. The method of claim 26 wherein the second condition comprises correct operation of the inertial measurement unit and absence of deep integration of the GPS receiver.

30. The method of claim 26 wherein the second condition comprises correct operation of the inertial measurement unit and non-execution of deep integration of the GPS receiver.

31. The method of claim 26 wherein the third condition comprises execution of deep integration of the GPS receiver.

32. The method of claim 20 wherein the first condition comprises failure of the inertial measurement unit, and wherein the second condition comprises correct operation of the inertial measurement unit and non-execution of deep integration of the GPS receiver.

33. The method of claim 32 wherein the third condition comprises execution of deep integration of the GPS receiver.

* * * * *